No. 719,935. PATENTED FEB. 3, 1903.
R. H. CASSWELL.
MILK COOLER.
APPLICATION FILED MAY 29, 1902.
NO MODEL.
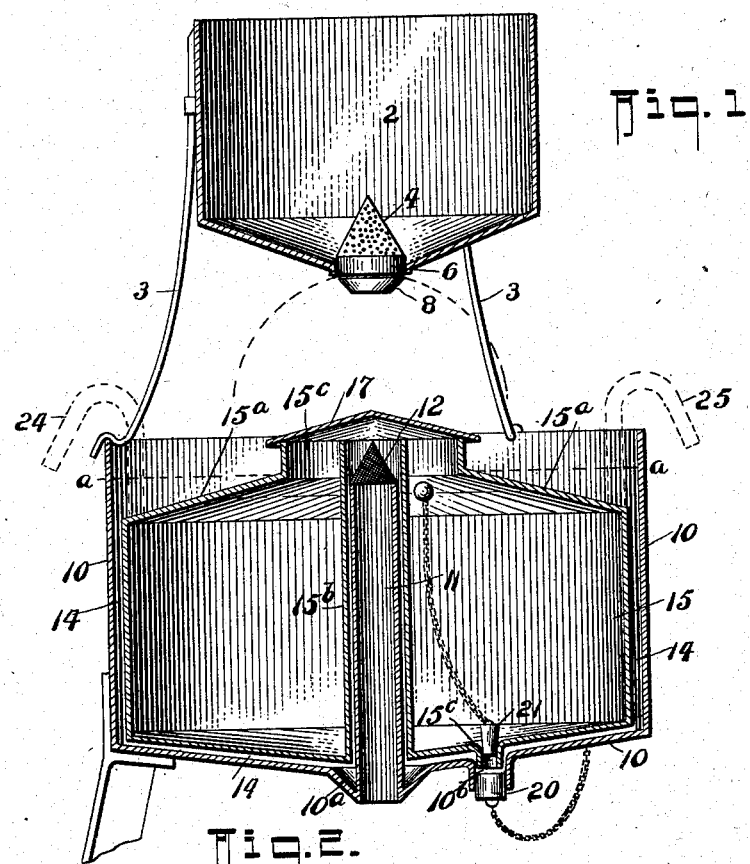
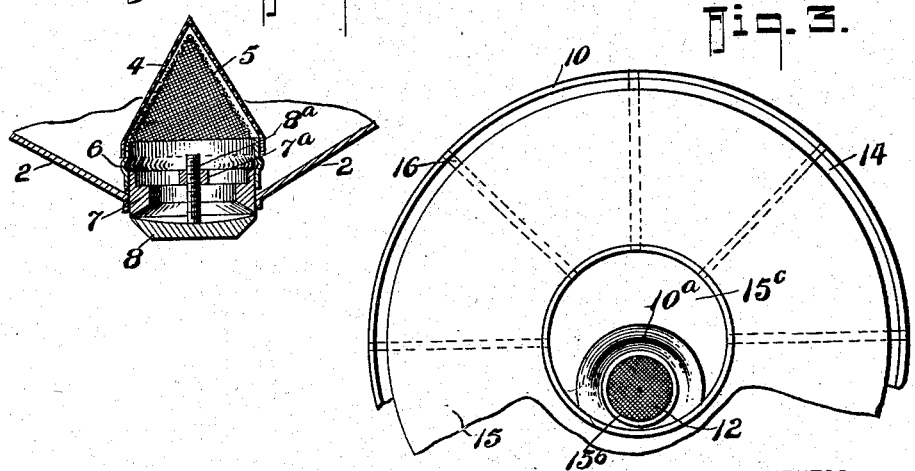
WITNESSES:
Louis Dieterich
A. E. Dieterich
INVENTOR
Richard H. Casswell
BY
Fred G. Dieterich
ATTORNEY

UNITED STATES PATENT OFFICE.

RICHARD H. CASSWELL, OF VANCOUVER, CANADA, ASSIGNOR OF ONE-HALF TO WILLIAM ERNEST BURNS, OF VANCOUVER, BRITISH COLUMBIA, CANADA.

MILK-COOLER.

SPECIFICATION forming part of Letters Patent No. 719,935, dated February 3, 1903.

Application filed May 29, 1902. Serial No. 109,461. (No model.)

*To all whom it may concern:*

Be it known that I, RICHARD H. CASSWELL, a citizen of the Dominion of Canada, residing at Vancouver, in the Province of British Columbia, Canada, have invented a new and useful Milk-Cooler, of which the following is a specification.

My invention relates to a milk-cooler designed to effect the thorough straining and aeration of the milk before lowering its temperature by contact with the cooling-surface, under which treatment, the solid and gaseous impurities being removed, the milk will keep better. I have further aimed to so expose the milk to the cooling-surface that any desired reduction of temperature within ordinary requirements may be attained, and that in a manner that while thoroughly effective will be economical with the cooling agency employed.

My invention is fully described in the following specification, reference being made to the accompanying drawings, in which—

Figure 1 is a vertical section through the cooler and its associated parts; Fig. 2, an enlarged detail section of the strainer and spreader for aeration, and Fig. 3 a partial plan of the cooler with its receiving vessel removed.

The device consists, first, of a receiving vessel 2, into which the milk is poured from the milking-pail. This vessel is centrally supported by three legs 3 on the rim of the containing vessel 10 beneath. The bottom of the receiving vessel 2 is slightly conical downward toward the center and is provided with a strainer 4 of similar construction to that used in my milk-pail, for which my application for a patent was allowed April 12, 1902, Serial No. 96,513. It consists of one or more removable conical strainers, graded where more than one is used, to reject the larger impurities first and having the apices of the cones directed upward to within the vessel. Under this arrangement the flow of the milk tends to carry the retained impurities down the slope of the cones, and thus leaves their straining-surfaces unimpeded for subsequent use. I further attach the base of the straining-cone to a band 6 of non-straining area, which forms a socket for the removable attachment of the strainer and permits the retained impurities, which slide down the slope of the cone, to accumulate and be undisturbed at the lowest part of the vessel. Where a graded strainer is employed, I construct the outer cone of perforated sheet metal, as such offers less resistance to the sliding of the dirt from its surface, and the inner cone 5 is made of the usual wire-gauze, which will retain the finer impurities.

Below the strainer-cones is the spreader, which is designed to project the strained milk in a thin spherical film onto the cooler, by which means the purpose of aeration is effected before the temperature is reduced. This spreader consists of a stout ring 7, secured to the lowest part of the bottom of the receiving vessel 2 and projecting upward within the vessel to form the ring on which the straining-cones are socketed. The lower side of the ring 7 is beveled outwardly and is opposed by the disk 8, the outer edge of which coincides with the outer edge of the ring. The upper surface of the disk is concave, and it is adjustably connected to the ring by a stem $8^a$, threaded into the center of a crossbar $7^a$, secured to or forming part of the ring-casting. This enables the thickness of the issuing film of milk to be varied to suit the rate of flow and degree of aeration required.

The cooler consists of two principal parts—the milk-containing vessel 10, on the upper edge of which the receiving vessel is sustained and which is itself supported in any convenient manner at a suitable height from the floor to permit of milk-cans being placed beneath to receive the cooled milk for storing, and the cooler proper, 15, within the foregoing, adapted to hold the cooling medium, whether service-water, water and ice, or any other convenient heat-absorbing material, and onto and around which the milk is designed to flow slowly toward the exit. The bottom of the open-top containing vessel 10 is downwardly sloped toward the center and is there provided with an upwardly-projecting overflow outlet-pipe 11, having around its base an annular depression $10^a$, into which any heavy impurities settle, while the upper end of the outlet-pipe has a conical gauze strainer 12 to retain any light dust which may blow into the milk during its progress around the cooler. The cooler 15 is an inclosed vessel having a flattened conical top 15ᵃ and a hollow tube 15ᵇ toward its center, so that it is adapted to fit within the outer vessel 10 and follow its conformation, with an intervening space 14 between. The uniformity of this interspace around the sides and bottom is preserved by ribs 16, secured to either 10 or 15, but preferably to the former, as they will thereby strengthen it and support the walls and bottom of the inner vessel 15. The upper side of the vessel 15 is provided toward the middle with an opening 15ᶜ, provided with a cover 17. This provides a means for filling the vessel with water and ice or whatever cooling agent is used, and the overflow-pipe 11 and its inclosing tube 15ᵇ may be to one side of this opening, as shown in plan in Fig. 3, so that an opening of larger dimension may be available. If a water-service is used in the cooler, the pipes 24 and 25 may be connected, as shown by dotted lines in Fig. 1, the outlet-pipe 25 being taken from near the top to remove the warmer water more readily. The vessel 10 is emptied through an outlet 10ᵇ, closable with a plug 20, attached by a chain to the under side of it, and through the same opening is conveyed the outlet 15ᶜ from the inner vessel 15. The plug 21, closing the latter, may be secured by a chain to a floating handle, as shown in Fig. 1.

In use the inner or cooling vessel 15 being filled with ice and water the milk is poured from the milk-pails into the receiving vessel 2, in issuing from which it is efficiently strained and falling in a fine film from the spreader onto the surface of the cooler exposes an ample area for the purposes of aeration. The milk is retained in contact with the entire surface of the cooler between each charging, as it fills the interspace 14 around the sides and bottom and up the inner pipe 15ᵇ to the top of the overflow-pipe, as indicated by the line $a\, a$ in Fig. 1, and, moreover, the direction of the flow is such that it is brought in contact with the coldest surface of the inner vessel—viz., the bottom. Further, as the flow is downward during the earlier cooling the heavier impurities are carried to the bottom of the vessel and by its downward slope to the annular depression 10ᵃ, in which they are clear of the flow, while the purer milk ascends to the overflow-outlet and is finally strained before passing out.

I am aware that prior to my invention milk-coolers have been designed wherein the milk is allowed to flow over the surface of a vessel containing the cooling medium; but in these use has only been made of the outer surface of the cooling vessel, and the methods of straining and aeration have been imperfect.

I therefore declare that what I claim as new, and desire to be protected in by Letters Patent of the United States, is—

1. A milk-cooler of the character described, comprising in combination, an outer open-top vessel having a dished bottom, a central tube extended upwardly from the bottom, the said bottom having a depressed portion surrounding the lower end of the tube, whereby to form a collecting-pocket 10ᵃ, said outer vessel having internal ribs on its bottom and inner face, an inner vessel for holding the cooling agent, adapted to fit within the outer vessel and formed with a dished bottom, the bottom and outer edges of the said inner vessel being adapted to engage the internal ribs on the outer vessel, the said inner and outer vessels having communicating discharges, detachable closure members for said discharges, the inner vessel having a central tube of larger diameter than the tube on the outer vessel over which it is adapted to fit, the top of the inner vessel being dished upwardly and provided with a central annular portion 15ᶜ, which surrounds the upper ends of the central tubes, and a cover detachably fitted upon the said annular portion 15ᶜ, all being arranged substantially as shown and for the purposes described.

2. A milk-cooler, comprising a receiving vessel, whose bottom is dished and provided at its center with an upwardly-extending off-take-tube and with a plugged discharge, an internal cooling-agent-holding vessel, adapted to fit within the outer vessel, and means for holding it therein with its bottom and sides away from the sides and bottom of the outer vessel, whereby to produce an intervening milk-circulating space, the bottom of the said inner vessel having an upwardly-extending tube of greater diameter than the tube of the outer vessel over which it is adapted to fit, said inner vessel having a feed-opening at the top surrounding its tubular member, a detachable closure member for the said feed-opening, the bottom of the said inner vessel having a plugged discharge adapted to project into the plugged discharge of the outer vessel, all being arranged substantially as shown and described.

3. In a milk-cooling appliance of the character described, the combination with the milk-receiver, having a dished bottom, having a central aperture, a strainer in the said aperture, comprising an apertured body, whose lower face terminates in an upwardly-beveled circular rim, whose upper end projects above the bottom of the receiver to form a solid ledge, a strainer-cone detachably fitted on the said ledge, and a spreader comprising a disk, having a concaved upper face for opposing the beveled rim of the solid apertured body, and having a shank adjustably engaging a receiving member forming a part of the said solid body, all being arranged substantially as shown and described.

In testimony whereof I have hereunto signed my name to this specification in the presence of two subscribing witnesses.

RICHARD H. CASSWELL.

In presence of—
ROWLAND BRITTAIN,
ELLICE WEBBER.